United States Patent [19]
Woods

[11] 3,909,768
[45] Sept. 30, 1975

[54] TERMINAL MOUNT FOR AN ELECTRICAL DEVICE
[75] Inventor: Lee O. Woods, Morrison, Ill.
[73] Assignee: General Electric Company, Fort Wayne, Ind.
[22] Filed: Oct. 23, 1973
[21] Appl. No.: 409,011

Related U.S. Application Data
[63] Continuation of Ser. No. 290,574, Sept. 20, 1972.

[52] U.S. Cl. ........ 337/380; 200/166 CT; 200/166 J; 339/218 R
[51] Int. Cl.² .......................................... H01H 37/04
[58] Field of Search ...... 339/218 R, 218 S, 218 LC; 337/112, 113, 121, 327, 328, 354, 372, 380, 381, 398; 174/59; 200/166 CT, 166 J

[56] References Cited
UNITED STATES PATENTS 2,745,924  5/1956  Coates .............................. 337/372
3,530,419  9/1970  Hire ................................. 337/354

*Primary Examiner*—L. T. Hix
*Assistant Examiner*—Fred E. Bell
*Attorney, Agent, or Firm*—Joseph E. Papin

[57]  ABSTRACT

A terminal mount for an electrical device, which has a housing with a pair of interconnecting walls and terminal means extending through at least one of the walls, is provided with means in the housing for supporting the terminal means and spaced from the other of the walls. Flowable adhesive means secures the supporting means and terminal means, and means is provided for channeling excess adhesive means from the supporting means to the base wall.

39 Claims, 4 Drawing Figures

TERMINAL MOUNT FOR AN ELECTRICAL DEVICE

CROSS REFERENCE TO RELATED APPLICATION

This is a continuation of my copending application Ser. No. 290,574 filed September 20, 1972, which is specifically incorporated by reference herein.

BACKGROUND OF THE INVENTION

This invention relates generally to terminal mounts for electrical devices and in particular to those in which electrically conductive terminals are secured by flowable adhesive means to a dielectric housing.

In the past, the operative components of many electrical devices were positioned within dielectric housings formed of moldable plastics or the like or other dielectric materials, and these operative components were electrically connected to electrical apparatus and circuits externally of the electrical device through electrical conductive, metallic terminals which were secured to supports formed integrally or unitarily with dielectric housings. The past terminals were secured to the dielectric housings by various well known adhesives, such as thermosetting epoxy resins or the like, and typically, these adhesives were viscous at room temperatures while being highly fluid at elevated temperatures. During manufacture, either the terminal, its support, or both were coated with a layer of the adhesive, and the terminal was then placed upon the support with the combined terminal and support structure being thereafter heated. Upon cooling, the adhesive adhered the terminal rigidly to the support.

As previously stated, the thermosetting adhesives, such as epoxy resins or the like, become highly fluid at elevated temperatures, and one of the disadvantageous or undesirable features of the past constructions for mounting terminals to dielectric housings was that it was quite difficult to control the flow of the adhesives while securing terminals to dielectric housings in the manner described above. Another disadvantageous feature of the past constructions was that the adhesive became so highly fluid that in addition to seeking lower levels through gravitational forces it frequently also tends to flow both without the dielectric housing and also upwardly within close, confined spaces within the dielectric housing through the forces of capillary action and surface adhesive attraction. Such uncontrolled flow resulted in another disadvantageous feature of the past constructions since the presence of adhesives upon the operative components of the electrical device was quite detrimental, and such uncontrolled flow of the adhesives seriously impaired the impaired of the operative components. In small devices, the above discussed disadvantageous features assume significant proportions insomuch as the operative components, such as contacts, heaters, and bi-metal elements or the like, were typically located quite closely to the terminals mounted in the electrical devices, and in some cases, some of the operative components, such as switch contacts for example, are mounted directly upon the terminal. In addition to the foregoing, another disadvantageous feature of the past constructions was that many electrical devices, such as thermostatic switches, or the like employed heating elements and the thermosetting adhesive flowed, in the manner discussed above, onto the heating elements being thereby vaporized and subsequently condensing upon other operationg components located a substantial distance therefrom and otherwise contaminating the interior of the dielectric housing.

SUMMARY OF THE INVENTION

Among the several objects of the present invention may be noted the provision of a novel terminal mount for electrical devices which overcomes the disadvantageous or undesirable features of the past constructions, as discussed hereinabove, as well as others; the provision of an electrical device utilizing such terminal mount in which excess adhesive means for securing a conductive terminal to a dielectric housing of the electrical device is channeled away for collection; the provision of a means for mounting a conductive terminal to a dielectric housing in which the excess adhesive for securing the terminal to the dielectric housing is predeterminately collected thereby to prevent contamination of associated operative components within the housing; and the provision of a terminal mount for an electrical device which is economical to manufacture, simplistic in construction, and easily assembled with conductive terminals.

In general, a terminal mount in one form of the invention for an electrical device having a housing with a pair of interconnecting walls and terminal means extending through one of the walls comprises means in the housing for supporting the terminal means. Flowable adhesive means secures the supporting means and terminal means, and means is provided for channeling excess adhesive means from the supporting means to the base wall.

More particularly in another form of the invention, a terminal mount is provided for an electrical device having a generally cup-shaped dielectric housing base member with an interior base floor and a wall rising from a peripheral portion of the base floor, the wall having an aperture through which a terminal may extend between the interior and exterior of the electrical device. The terminal mount comprises a step rising from the base floor and extending from the wall adjacent the aperture. The step has a recess in a top surface thereof and a trough communicating from the recess to the step periphery. A terminal may thus be extended through the aperture with a planar terminal surface overlaying the top surface of the step and with a terminal tab projecting downwardly into the recess. The terminal may then be secured to the mount by a flowable adhesive disposed within the recess in contact with the terminal tab. Excess thermosetting adhesive may flow from the recess through the trough towards the periphery of the step and the base foor.

Further, and in general, means of this invention in another form thereof for mounting a conductive terminal means to a dielectric housing means comprises means integral with the housing means including means for supporting the terminal means within the housing means. Means is provided in the housing for collecting excess adhesive means adapted for securing engagement between the supporting means and terminal means, and means is disposed in the integral means for conveying the excess adhesive means from the supporting means to the collecting means.

In addition to the foregoing and also in general, an electrical device of this invention in another form thereof is provided with a housing having a chamber therein. Terminal means extend into the chamber, and means on the housing support the terminal means. A flowable adhesive means is disposed in securing engagement between the supporting means and terminal means, and means in the supporting means convey excess adhesive means into the chamber.

BRIEF DESCRIPTION OF THE DRAWINGS

Corresponding reference characters indicate corresponding parts throughout the several views of the drawings.

Figure 1:
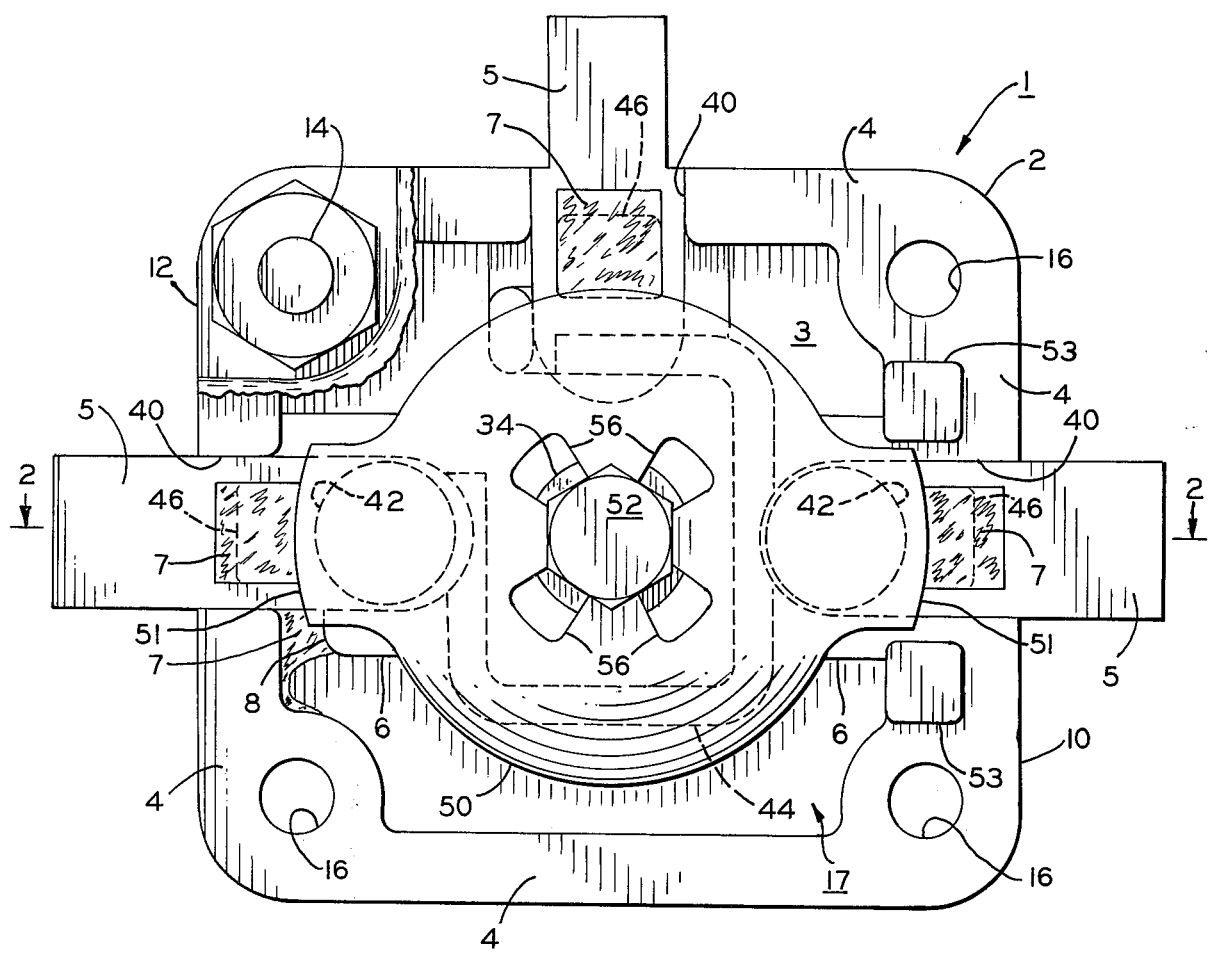
FIG. 1 is a plan view of an electrical device of the present invention in one form with most of the upper hosuing cover broken away.

The following examples illustrate the invention and are not to be construed as limiting.

DETAILED DESCRIPTION OF THE PREFERRED EMBODIMENT

Referring now to the drawings (FIGS. 1–4) in general, there is shown a terminal mount for an electrical device, such as an electrical or thermostatic switch means or the like indicated generally at 1, having a housing 2 with a pair of interconnecting walls, such as a floor or base wall 3 and side walls 4, and terminal means, such as electrically conductive metallic terminals 5, extend through one of the walls, i.e. through the side wall as shown. Means, such as steps or supports 6, is provided in housing 2 for supporting terminal means 5, and flowable adhesive means or material 7 of a type well known in the art is secured in engagement between supporting means 6 and the terminal means. Means, such as groove means or troughs 8, are provided for channeling excess adhesive means 7 from supporting means 6 to the other of the walls, i.e. the base wall 3 (FIG. 4).

Figure 2:
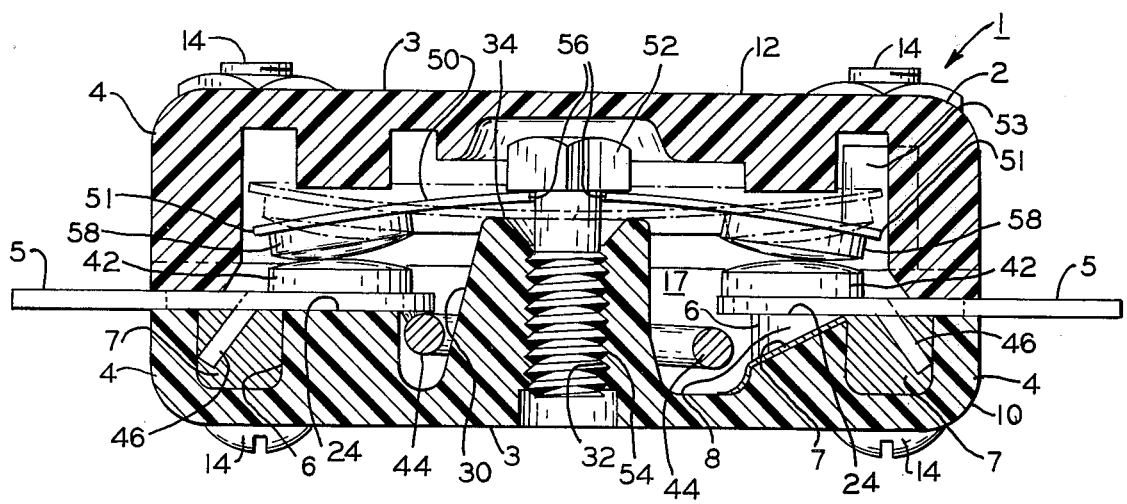
FIG. 2 is a sectional view taken along line 2—2 of FIG. 1.
Figure 3:
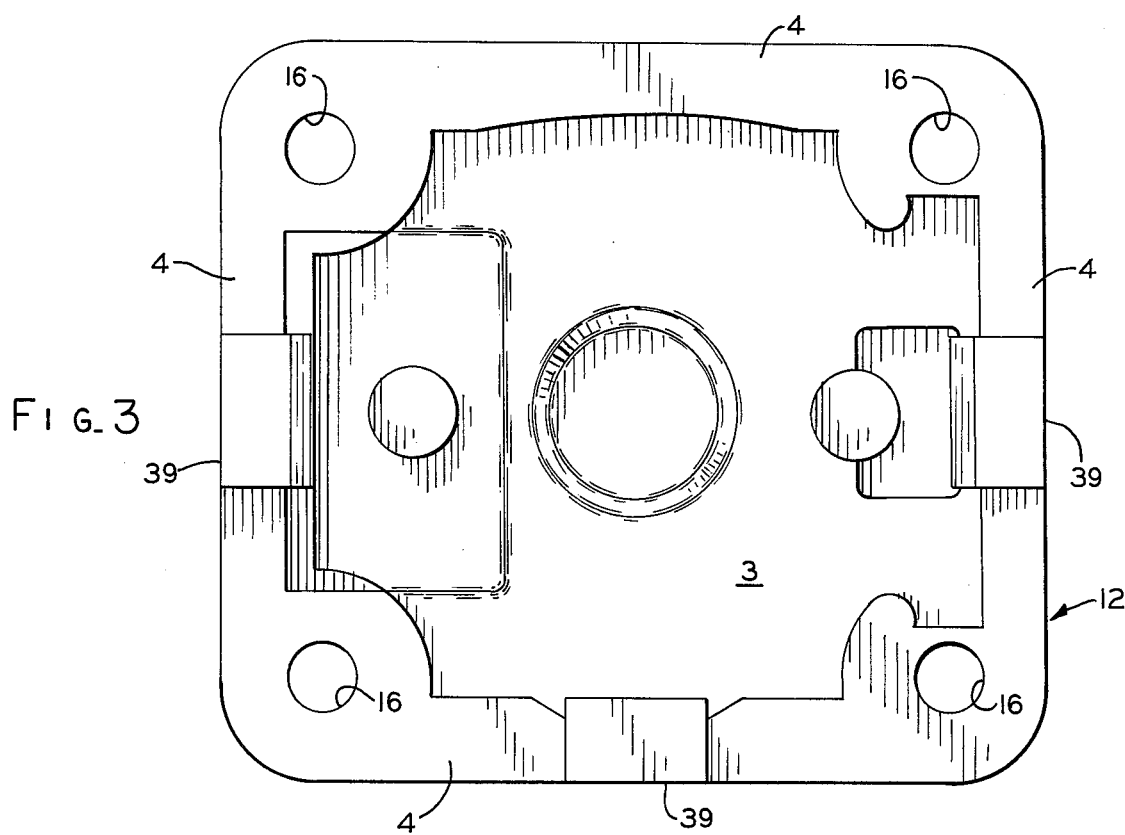
FIG. 3 is a bottom plan view of the cover for the electrical device of FIG. 2 showing the interior thereof as disassociated from the base of the electrical device.
Figure 4:
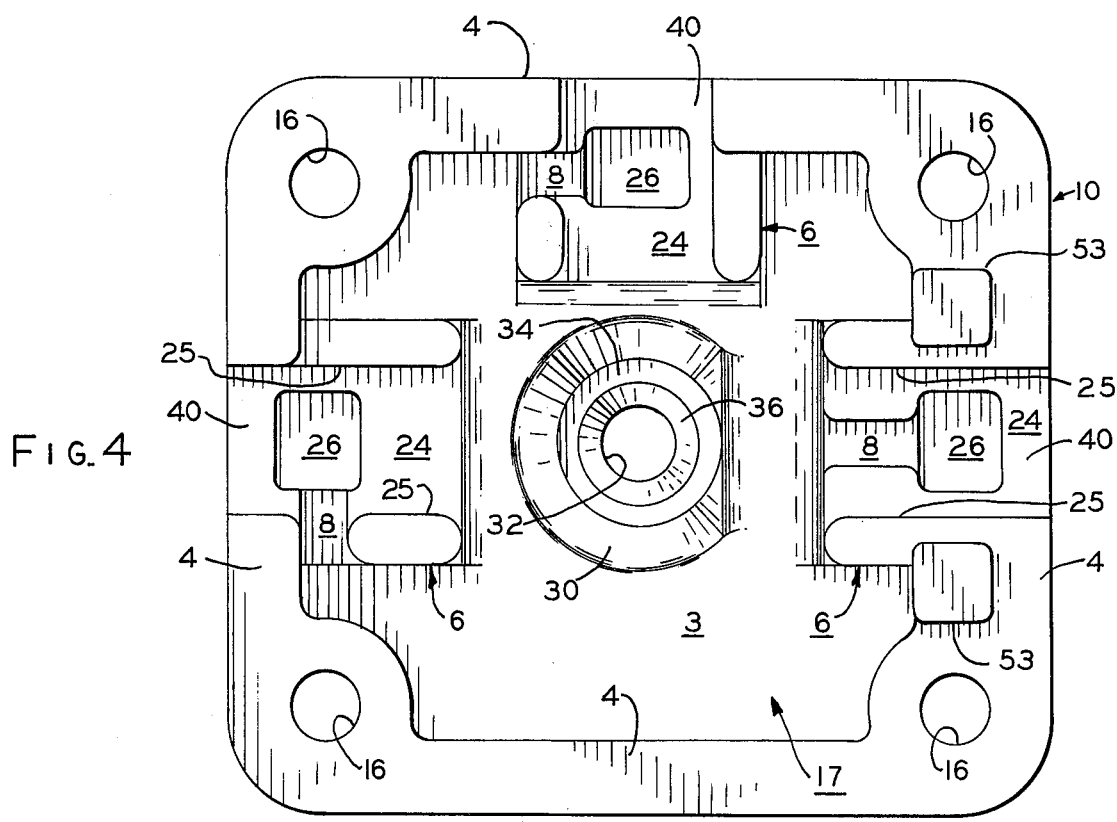
FIG. 4 is a top plan view of the base for the electrical device of FIG. 2 showing the interior thereof as disassociated from the cover.

More particularly and with reference to FIGS. 2–4, housing 2 is provided with a lower or base number 10 and an upper or cover member 12 molded or otherwise formed from a dielectric material, such as rubber or plastic or the like, and the opposite marginal edges or surfaces of the side walls of the base and cover members are secured or mounted together by suitable means, such as a plurality of nut and bolt assemblies 14 or the like, which extend through aligned mounting holes 16 respectively provided therefor in the base and cover members. When so mounted together, base walls 3 and side walls 4 of base and cover members 10, 12 generally define a chamber 17 in which the operating component parts of electrical device 1 are disposed, as discussed hereinafter, and it is also contemplated that other fastening or mounting means, such as rivets or screws or the like, may alternatively be used in place of nut and bolt assemblies 14 to maintain the base and cover members of housing 2 mounted together against displacement.

The interior of base member 10, as shown in FIG. 4, with side walls 4 peripherally disposed and integrally interconnected with base wall 3, is provided with supporting means or steps 6 respectively integrally formed between the base wall and three of the side walls; however, it is also contemplated that the steps could be integrally formed with only one of the base wall and side walls and spaced from the other thereof, if desired. Steps 6 rise above base wall 3 having a generally planar upper or top surface 24 for seating engagement with terminals 5, and the top surfaces are generally coextensive with the marginal edges of side walls 4 of base member 17. Receiving means, such as a recess or other hole 26, for holding an amount of adhesive material 7 extend into the steps 6 and adjacent side walls 4 intersecting with the surfaces 24; however, it is contemplated that recesses 26 may, if desired be disposed entirely within the steps and spaced from the side walls adjacent thereto. Groove means 8 are each respectively disposed in steps 6 with the upper end portions of the groove means intersecting with step surfaces 24 and recesses 26 while the lower end portions of the groove means are provided to empty or convey excess adhesive material 7 onto base wall 3 of base member 10, the generally central portion of which defines a sump for the collection of the excess adhesive material 7. From the centrally located portion of base wall 3 of base member 10 integrally extends a generally conic projection or hub 30 having a generally vertical, threaded, central bore 32, and the hub is truncated to provide an annular, planar upper or free end or surface 34. The upper end of bore 32 is beveled or flared as shown by conic surface 36.

As shown in FIG. 3 and as previously mentioned, side walls 4 of cover member 12 are formed to mate with the opposite side walls 4 of base member 10, and when the cover and base members are assembled or mounted together, wall extensions 39 project partially downwardly over surfaces 24 of steps 6 thereby forming slots or apertures 40 which pass through the mated side walls.

Referring now to FIGS. 1 and 2, electrical device 1 is seen to have three generally planar terminals 5 extending from the exterior of housing 2 through slots 40 into seating engagement with surfaces 24 of steps between shoulders 25. To the exposed tops of two of terminals 5 are secured two stationary or fixed switch contacts 42, and a heater wire 44 is secured to the third one of the terminal and to one of the contact supporting terminals. Heater wire 44 partially encircles hub 30 in spaced relation with both it and base wall 3 of housing base member 10 in which it is disposed. Means, such as terminal tabs 46, are integral with terminals 5 being bent therefrom to project or extend downwardly into recesses 26 within steps 6. Adhesive material 7, such as an epoxy resin or the like which may be thermosetting, is set into recesses 26, as hereinafter described in more detail, in intimate contact or securing engagement with terminal tabs 46, and once set, the adhesive material firmly secures terminals 5 atop steps 6 and thus to the housing base member 10. During assembly, excess adhesive flows downwardly from recesses 26 through groove means 8 to base wall 3 of housing base member 10, and the quantity of the adhesive material in excess to the volumetric capacity of recess 26 is ordinarily slight and certainly insufficient to cover base wall 3 of housing base member 10 and thereby build upwardly towards heater wire 44. Being below the top surface of the terminals 5, there is also little danger of adhesive material 7 flowing onto fixed switch contacts 42.

A thermoresponsive element, such as a generally disc shaped sheet of bimetal 50, is mounted within housing 2 by means of a stud 52 or the like having a threaded shank 54. One of two unitary tail portions 51 of bimetal disc 50 are positioned between two posts 53 which prevent the disc from rotating, and an unthreaded portion of stud shank 54 passes loosely through a central aperture 56 in the bimetal disc. Disc central aperture 56 is generally in the shape of a four leaf clover which serves to provide bimetal disc 50 with good snap action characteristic during actuation. Threaded shank 54 of stud 52 is threadedly received in bore 32 within hub 30 until the stud engages mobile switch contacts 58 secured beneath peripheral portions of bimetal disc 50 in engagement with fixed contacts 42, and the stud may then be adjustably threaded further into bore 32 for switch operational adjustment. As this action progresses, stud 52 forces the central portion of bimetal disc 50 towards annular surface 34 atop hub 30 whereupon a smaller increase in the temperature of the disc will cause the disc to snap to the position shown in phantom in FIG. 2, and such snap action, in turn, causes switch contacts 42, 58 to break. Subsequent cooling of bimetal disc 50 forces it to snap back to its initial or adjusted position thereby causing fixed and mobile contacts 42, 58 to remake.

From the above description, it may be noted that stud 52 limits movement of the central portion of bimetal disc 50 upwardly, as viewed in FIG. 2, while annular surface 34 atop hub 30 limits downward movement of this portion of the disc. Thus, stud 52 and annular surface 34 function as stops, and at the same time, the stud also serves as mounting and adjustment means for the bimetal disc 50.

In one process for securing terminals 5 to housing steps 6, adhesive material 7 is coated to that portion of the bottom planar surface of the terminals which is to overlay top surfaces 24 of the steps. Terminals 5 are then placed upon step surfaces 24 between shoulders 25 with a portion of the terminals extending exteriorly of electrical device 1. Adhesive material 7 is then heated causing it to change from its rather viscous state and become highly fluid thereby to flow towards and then down into recesses 26. Should the volumetric capacity of recesses 26 below groove means 8 be insufficient to accommodate all of the adhesive material, the excess thereof will overflow downwardly through the groove means to base wall 3 of base member 10, as shown in FIGS. 1 and 2. With this manner of controlling the excess flow of adhesive material 7, there will be little tendency for any adhesive material to flow onto contacts 42 by surface adhesive forces, and it may also be noted that the spacing between base wall 3 of base member 10 and heater 44 is much too great for any build up of overflowed or excess adhesive material upon the base wall to reach the heater. Some adhesive material 7 may flow onto the junction of heater 44 to terminal 5, but such ordinarily will present no problem since this portion of the heater operates relatively cooly due to its proximity with the terminal itself which acts as a heat sink. Consequently, adhesive material 7 will not tend to vaporize.

In view of the foregoing, it is now apparent that a novel terminal mount, electrical device, and means for mounting a conductive terminal to a dielectric housing means is provided overcoming the disadvantageous features of the prior art constructions, as well as others, and change as to the precise configurations, shapes and details of the constructions set forth herein for purposes of illustration may be made by those skilled in the art without departing from the spirit and scope of the invention which is limited only by the claims which follow.

What I claim as new and desire to secure by Letters Patent of the United States is:

1. A terminal mount for an electrical device having a generally cup-shaped dielectric housing base member having an interior base floor and a wall rising from a peripheral portion of the base floor with the wall having an aperture through which a terminal may extend between the interior and exterior of the electrical device, said terminal mount comprising a step rising from said base floor and extending from said wall adjacent said aperture, said step having a recess in the top surface thereof and a trough communicating from said recess to the periphery of said step whereby a terminal may be extended through the aperture with a planar surface of the terminal overlaying the step and with a terminal tab projecting down into the recess, and the terminal secured to the mount by a thermosetting adhesive disposed within the recess in contact with the terminal tab and with excess thermosetting adhesive flowing from the recess through the trough towards the periphery of the step and the base floors.

2. A terminal mount in accordance with claim 1 wherein said dielectric housing base member is formed of a moldable phenolic resin.

3. A terminal mount in accordance with claim 1 wherein said thermosetting adhesive is an epoxy resin.

4. A terminal mount in accordance with claim 1 wherein at least a portion of said top surface of said step is substantially coplanar with a surface of said wall partially defining said aperture, whereby a planar surface of a terminal may be disposed upon the coplanar surfaces over at least portions of the recess and trough.

5. An electrical device comprising a hollow dielectric base having an interior floor and walls encompassing the periphery of said floor, a dielectric cover, means securing together said dielectric base and cover, one of said walls defining an aperture, a step rising from said base floor and extending from said one wall adjacent said aperture, a recess within the top surface of said step, a conduit extending from said recess to the periphery of said step, a terminal extending through said aperture and overlaying at least a portion of said recess with a tab formed integrally with said terminal projecting into said recess, and a thermosetting adhesive within said recess in intimate contact with said tab.

6. An electrical device in accordance with claim 5 comprising a layer of thermosetting adhesive disposed between the top surface of said step and said terminal.

7. A thermostatic switch comprising a dielectric base; a dielectric cover; and means securing together said base and cover; said dielectric base having a floor, a centrally located projection extending upwardly from said floor, a plurality of steps extending upwardly from said floor, and a plurality of walls extending upwardly from the periphery of said floor to form a cavity encompassing said centrally located projection; said thermostatic switch further comprising a plurality of conductive terminals mounted on said plurality of steps with tabs formed integrally with said terminals extending into recesses within said steps from which recesses troughs extend to the periphery of said steps and into which recesses thermosetting adhesive is placed securing said terminals to said steps with excess thermosetting adhesive flowing through said troughs towards the periphery of said steps and said base floor during manufacture; at least one fixed switch contact mounted atop one of said terminals; a thermoresponsive element adjustably mounted above said centrally located projection; and at least one mobile switch contact mounted to said thermoresponsive element to make and break with said fixed switch contact upon actuation of said thermoresponsive element.

8. In a thermostatic switch means for mounting an electrically conductive terminal to a molded dielectric housing member, said mounting means comprising an electrically conductive terminal having a substantially planar surface from which a tab projects; a molded dielectric housing having a base member defining a cavity and a raised step partially bounding said cavity; said raised step having a substantially planar top surface, a recess in said planar top surface, and a trough extending from said recess to said cavity; said terminal being mounted atop said raised step with said substantially planar terminal surface upon said substantially planar step top surface and with said terminal tab projecting into said recess; whereby a thermosetting adhesive may be poured into said recess to secure said terminal tab to said step with any excess adhesive flowing through said trough towards said cavity prior to setting of the adhesive during switch manufacture.

9. A terminal mount for an electrical device having a housing with a pair of interconnecting walls and terminal means extending through one of the walls, the terminal mount comprising means in the housing for supporting the terminal means, flowable adhesive means for securing engagement between the supporting means and terminal means, and means for channeling excess adhesive means from the supporting means to the other of the walls.

10. A terminal mount as set forth in claim 9, further comprising a surface on the supporting means to which the terminal means is adhered, the surface being spaced above the other wall.

11. A terminal mount as set forth in claim 10, wherein the channeling means is disposed between the surface and the other wall.

12. A terminal mount as set forth in claim 11, wherein the channeling means comprises groove means in the support means between the surface and the other wall.

13. A terminal mount as set forth in claim 9, wherein the channeling means comprises groove means in the suppport means.

14. A terminal mount as set forth in claim 9, further comprising recess means in the support means in which the adhesive means is disposed, the channeling means being connected with at least a portion of the recess means.

15. A terminal mount as set forth in claim 14, wherein the terminal means comprises means extending into the recess means for securing engagement with the adhesive means therein.

16. A terminal mount as set forth in claim 15, further comprising a surface on the supporting means on which the terminal means is seated, and the recess means intersecting with the surface.

17. A terminal mount as set forth in claim 16, wherein the adhesive means is adhered between at least a portion of the surface and the terminal means seated thereon, and the channeling means also intersects with the surface.

18. A terminal mount as set forth in claim 9, wherein the supporting means is integral with at least one of the one and other walls.

19. A terminal mount as set forth in claim 18, wherein at least a portion of the other wall defines sump means for the collection of the excess adhesive means therein.

20. An electrical device comprising a housing having a chamber therein, terminal means extending into the chamber, means on the housing for supporting the terminal means within the chamber, flowable adhesive means for setting in securing engagement between the supporting means and terminal means, and means in the supporting means for conveying excess adhesive means prior to the setting thereof into a portion of the chamber defining a sump for the collection of the excess adhesive means.

21. An electrical device as set forth in claim 20, further comprising means in the supporting means for receiving the adhesive means, and the conveying means communicating with the receiving means.

22. An electrical device as set forth in claim 20, further comprising means on the supporting means for seating the terminal means, the adhesive means being set in securing engagement between at least portions of the terminal means and the seating means, respectively.

23. An electrical device as set forth in claim 22, further comprising recess means in the supporting means intersecting with the seating means and in which adhesive means is received, and the conveying means intersecting with both the seating means and recess means.

24. An electrical device as set forth in claim 22, wherein the seating means is predeterminately spaced above the sump.

25. An electrical device as set forth in claim 21, wherein the conveying means comprises groove means having an end portion intersecting with the receiving means and an opposite end portion for communication with the sump.

26. An electrical device as set forth in claim 21, further comprising means on the terminal means extending into the receiving means in securing engagement with the adhesive means therein upon the setting of the adhesive means.

27. An electrical device as set forth in claim 26, wherein the extending means comprises a tab connected with the terminal means and having a free end portion within the receiving means.

28. Means for mounting a conductive terminal means to a dielectric housing means comprising means integral with the housing means including means for supporting the terminal means within the housing means, means in the housing for collecting excess flowable adhesive means adapted for hardening in securing engagement between the supporting means and terminal means, and means disposed in the integral means for conveying the excess adhesive means from the supporting means to the collecting means.

29. A mounting means as set forth in claim 28, wherein the collecting means comprises at least one wall of the housing means predeterminately spaced from the supporting means.

30. A mounting means as set forth in claim 28, wherein the supporting means comprises a surface on the integral means elevated relative to the collecting means, the adhesive means being respectively secured with at least a portion of the surface and the terminal means.

31. A mounting means as set forth in claim 28, wherein the conveying means comprises groove means.

32. A mounting means as set forth in claim 28, further comprising other means disposed in the integral means and communicating with the supporting means for collecting the adhesive means prior to the hardening thereof, and the conveying means communicating with at least a portion of the other means.

33. A mounting means as set forth in claim 32, further comprising means on the terminal means and extending into the other means for securing engagement with the adhesive means therein upon the hardening of the adhesive means.

34. A mounting means as set forth in claim 28, wherein the housing means includes at least a pair of interconnecting wall means, the integral means being integral with at least one of the wall means and at least one of the wall means defining the collecting means.

35. A mounting means as set forth in claim 34, further comprising aperture means in one of the wall means through which the terminal means extends exteriorly of the housing means.

36. A mounting means as set forth in claim 35, wherein the supporting means comprises a surface on which the terminal means is seated, and a portion of the surface defining a portion of the aperture means.

37. A mounting means as set forth in claim 36, further comprising recess means disposed in the integral means adjacent the aperture means and intersecting with the surface for collecting adhesive means therein.

38. A mounting means as set forth in claim 37, wherein the conveying means comprises a trough having an upper end portion intersecting with both the surface and the recess means and a lower end portion communicating with the collecting means for emptying thereinto the excess adhesive means.

39. A mounting means as set forth in claim 37, further comprising tab means on the terminal means having at least a portion extending into the recess means into securing engagement with hardened adhesive means therein thereby to prevent displacement of the tab means from the recess means.

* * * * *